(12) United States Patent
Hao et al.

(10) Patent No.: US 9,210,065 B2
(45) Date of Patent: Dec. 8, 2015

(54) PROVIDING CLOUD-BASED SERVICES USING DYNAMIC NETWORK VIRTUALIZATION

(75) Inventors: Fang Hao, Morganville, NJ (US);
Tirunellai V. Lakshman, Morganville, NJ (US); Sarit Mukherjee, Marlboro, NJ (US); Haoyu Song, Edison, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 1655 days.

(21) Appl. No.: 12/489,187

(22) Filed: Jun. 22, 2009

(65) Prior Publication Data

US 2010/0322255 A1 Dec. 23, 2010

(51) Int. Cl.
*H04L 12/28* (2006.01)
*H04L 12/701* (2013.01)
*G06F 9/455* (2006.01)
*H04L 12/751* (2013.01)
*H04L 29/08* (2006.01)

(52) U.S. Cl.
CPC ............ *H04L 45/00* (2013.01); *G06F 9/45558* (2013.01); *H04L 45/02* (2013.01); *G06F 2009/4557* (2013.01); *H04L 67/10* (2013.01)

(58) Field of Classification Search
CPC ................... G06F 9/45558; G06F 2009/4557; H04L 45/02; H04L 45/00; H04L 67/10
USPC ....................................................... 370/398
See application file for complete search history.

(56) References Cited

U.S. PATENT DOCUMENTS

| | | | | |
|---|---|---|---|---|
| 2004/0128670 A1* | 7/2004 | Robinson et al. | ................. | 718/1 |
| 2004/0181530 A1* | 9/2004 | Smith et al. | ....................... | 707/9 |
| 2006/0111909 A1* | 5/2006 | Maes et al. | .................... | 704/270 |
| 2006/0179480 A1* | 8/2006 | Jardin et al. | .................... | 726/15 |
| 2007/0147279 A1* | 6/2007 | Smith et al. | ................... | 370/316 |
| 2009/0276771 A1* | 11/2009 | Nickolov et al. | ............. | 717/177 |

OTHER PUBLICATIONS

"Ethane: Taking Control of the Enterprise" by Casado et al. (ACM SIGCOMM Aug. 2007).*
Casado, M. et al., "Ethane: Taking Control of the Enterprise", SIGCOMM'07, Aug. 27-31, 2007, Kyoto Japan.
Bradford, R. et al., "Live Wide-Area Migration of Virtual Machines Including Local Persistent State", VEE '07, Jun. 13-15, San Diego, CA.
Caesar, M et al., "Design and Implementation of a Routing Control Platform".
Wakikawa, R. et al., "Home Agents Towards Internet-Scale Mobility Deployments" Context "06 Lisboa, Portugal 2006.
Lakshman, T.V. et al., The Softrouter Archietecture.

(Continued)

*Primary Examiner* — Ayaz Sheikh
*Assistant Examiner* — Hai-Chang Hsiung
(74) *Attorney, Agent, or Firm* — Kramer & Amado, P.C.

(57) ABSTRACT

The invention is directed to providing cloud-based services using dynamic network virtualization. Embodiments of the invention provide a cloud-based service over a system that has a dynamic network virtualization architecture. The architecture includes a set of distributed forwarding elements with centralized control, and at least one virtual machine that is bound to one of the forwarding elements. These features enable the virtual machine to be migrated across a wide area network while maintaining its original IP address and service continuity.

8 Claims, 3 Drawing Sheets

(56) References Cited

OTHER PUBLICATIONS

Rexford, J. et al., "Network-Wide Decision Making: Toward a Wafer-Thin Control Plan".

McKeown, N., et al., "Openflow: Enabling Innovation in Campus Networks", ACM SIGCOMM Computer Communication Review, vol. 38, No. 2, Apr. 2008 p. 69-74.

\* cited by examiner

PROVIDING CLOUD-BASED SERVICES USING DYNAMIC NETWORK VIRTUALIZATION

FIELD OF THE INVENTION

The invention is directed to packet switching communication networks, particularly to providing services according to a cloud-computing paradigm in which applications are hosted by virtual machines (VM) in interconnected data centers.

BACKGROUND OF THE INVENTION

It is envisaged that services and applications will migrate to a cloud-computing paradigm where thin-clients on user-devices access, over a packet switched network, applications hosted in data centers by application service providers. Examples include Software as a Service (SaaS) applications, cloud-based gaming applications and cloud-supported virtual desktops. For good performance and efficiency, it is desirable to deliver these services from certain locations, which are dependent on a current set of users. Typically, this set of users is continually changing; hence such locations are likewise dynamic in their nature.

To accommodate the need to deliver cloud-based services from a dynamically changing group of locations, we expect that services will be hosted on virtual machines in interconnected data centers and that these virtual machines will migrate dynamically to locations best-suited for the current user population. However, typical VM migration techniques currently only support migration in the same local area network (LAN). This is because the VM needs to maintain the same Internet Protocol (IP) address in order to avoid service interruption and, according to current fixed line network architecture, each IP address belongs to a subnet, which is associated with a single LAN.

A solution to migrate a VM across a wide-area network by using dynamic DNS and tunneling has been proposed in a paper entitled "*Live Wide-Area Migration of Virtual Machines including Local Persistent State*" by Bradford et al. in the proceedings of ACM/Usenix International Conference On Virtual Execution Environments, 2007. According to that approach, a VM is assigned a new IP address at a target location. During a transition period in which the IP address assignment takes place, the VM maintains both old and new IP addresses. Data packets going to the old address are forwarded from the old hosting machine to the new hosting machine via an IP tunnel. However, a limitation of this approach is that the duration of the transition period can be indefinite because it depends on multiple factors including the nature of services running on the VM and the client-side IP address caching behavior of those services. Hence, a forwarding agent of the VM may need to run indefinitely at the old hosting machine. This approach may also require VM software modification, since typical VM migration procedures are based on the IP address of the VM remaining unchanged.

Therefore, in view of the foregoing, it would be desirable to have a better way to migrate virtual machines across a packet switching network without losing service continuity.

SUMMARY

The invention is directed to providing cloud-based services using dynamic network virtualization.

Embodiments of the invention provide a cloud-based service over a system that has a dynamic network virtualization architecture. The architecture includes a set of distributed forwarding elements with centralized control, and at least one virtual machine that is bound to one of the forwarding elements. These features enable the VM to be migrated across a wide area network while maintaining its original IP address and service continuity.

One embodiment of the invention provides a virtual machine that can be tailored and dedicated to different services, and managed by different entities. This flexibility enables better network support for new applications and faster service provisioning.

One embodiment of the invention logically combines multiple geographically distributed physical devices to form a single virtualized logical router, where each physical device mimics a virtual line card with multiple virtual ports. The virtual line cards can be interconnected in a variety of ways to mimic a virtual backplane: they can be interconnected using dedicated facilities, as could be the case if the forwarding elements are in data centers; they can be interconnected using MPLS bandwidth-guaranteed paths; or they can be interconnected by tunnels through the public Internet.

In one embodiment of the invention, the distributed forwarding elements are configured and managed by a centralized controller (CC). Hereinafter, a such a configuration of FEs and one or more CCs is referred to as a Virtually Clustered Open Router (VICTOR). For convenience, we refer to a distributed forwarding element or router as simply a forwarding element (FE).

In one embodiment of the invention forwarding elements are deployed at the various candidate hosting locations where the VM for a particular service may reside. The centralized controller associated with these forwarding elements controls forwarding of data packets by all these forwarding elements and also keeps track of the current location of all the virtual machines associated with them.

In one embodiment of the invention, a VICTOR announces reachability of VM prefixes through all its forwarding elements. As a result, routers outside the VICTOR choose the closest FE when routing packets destined to those VMs. Since the centralized controller knows the actual location of each VM, which can dynamically migrate from one location to another, the CC configures each FE to forward the traffic to the actual FE where the VM is attached. Egress traffic from the VMs is sent directly to network routers outside the VICTOR by the FEs to which the VMs are attached.

According to an aspect of the invention, a method of providing a cloud-based service over a packet switching network via a system having a dynamic network virtualization architecture is provided. The network virtualization architecture includes a plurality of forwarding elements controlled by a central controller and a plurality of virtual machines, where each of the virtual machines is associated with one of the forwarding elements. The method comprises the steps of: receiving, at a first forwarding element, a data packet of said service; determining, by the first forwarding element, a destination of the data packet; forwarding, responsive to said destination being a virtual machine associated with the first forwarding element, the data packet directly to the virtual machine; receiving the data packet at the destination; and processing the data packet by the destination in accordance with said service.

According to another aspect of the invention, a system for providing a cloud-based service over a packet switching network is provided. The system comprises: a plurality of forwarding elements for routing data packets of said service; a central controller for controlling the plurality of forwarding elements; and a virtual machine for processing data packets of said service, the virtual machine being associated with a first forwarding element of the plurality of forwarding elements.

According to yet another aspect of the invention there is provided a method of migrating a virtual machine providing a cloud-based service to a user population via a system having a dynamic network virtualization architecture. The system comprises a plurality of forwarding elements controlled by a central controller. The method comprises: receiving, by the virtual machine, a first data packet of said service from a first forwarding element to which the virtual machine is bound by a first binding, the first data packet having a destination address of the virtual machine; detecting, by the system, a change in the user population; discovering, by the virtual machine responsive to said change, a second forwarding element; forming, by the virtual machine, a second binding with the second forwarding element; receiving, at the central controller, an indication of the second binding; initiating, by the central controller, release of the first binding; and receiving, by the virtual machine, a second data packet of said service from the second forwarding element, the second data packet having a destination address of the virtual machine.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
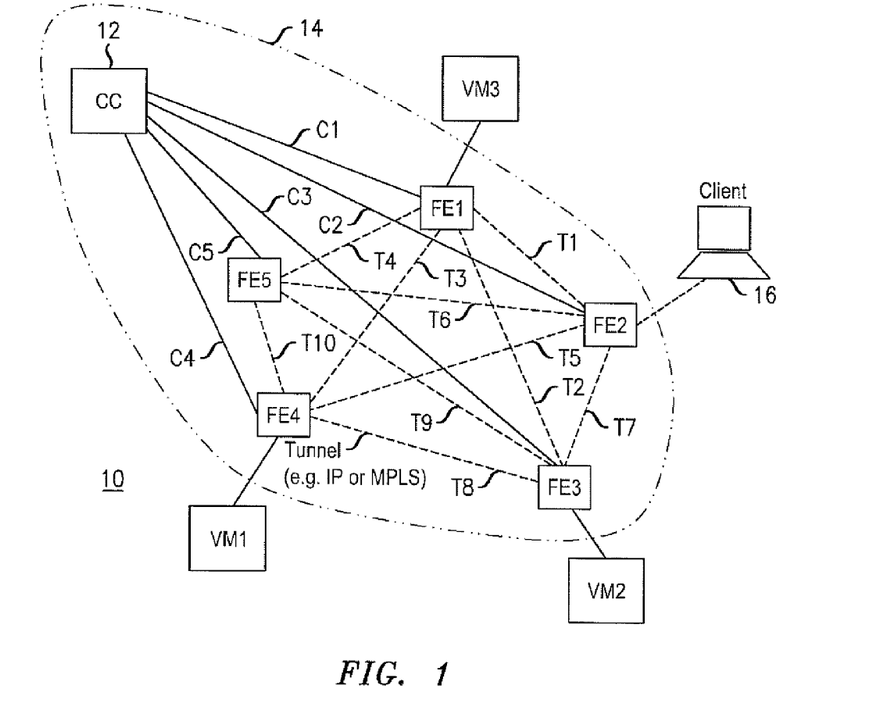
FIG. 1 illustrates a system for providing cloud-based services using dynamic network virtualization that is in accordance with a first embodiment of the invention.

Referring to FIG. 1, a system 10 for providing cloud-based services using dynamic network virtualization includes a cluster of forwarding elements (FEs) FE1-FE5 and one or more centralized controllers (CC) 12. The CC 12 has a respective control connection C1 to C5 to each forwarding element FE1-FE5. The forwarding element FE1-FE5 handle data plane functions such as packet forwarding, policing and policy enforcement. The forwarding element FE1-FE5 also set up a virtual backplane between each other as necessary. For example a fully meshed network of tunnels T1 to T10, e.g. IP or MPLS shown in FIG. 1 in dotted line, form the virtual backplane. Although a full mesh of tunnels is shown, it should be appreciated that such a full mesh is not a requirement. The system 10 includes a plurality of virtual machines VM1-VM3, each of which is bound to a respective forwarding element FE1-FE5. For example, a first forwarding element FE1 is bound to a third virtual machine VM3, a third forwarding element FE3 is bound to a second virtual machine VM2, and a fourth forwarding element FE4 is bound to a first virtual machine VM1. The CC 12 controls routing and signaling for each of the virtual machines' VM1-VM3 IP prefixes. The forwarding elements FE1-FE5 and the CC 12, of which there can be more than one, forms a configuration that can be viewed as one single loosely coupled router, where the forwarding elements FE1-FE5 are its line cards, and the CCs 12 are its control plane. The configuration is referred to herein as a Virtually Clustered Open Router (VICTOR) 14. However, unlike a conventional router which runs in one network, the forwarding elements FE1-FE5 can be distributed across a wide area and different networks. A forwarding element FE1-FE5 could be a simple data forwarding device that does not implement any control plane or routing functions, or it could be a regular router but with the VICTOR function enabled (i.e., with API that can be accessed from the CC 12 for control functions). In both cases, each forwarding element FE1-FE5 has the capability of forwarding packets based on forwarding tables that are computed and downloaded from the CC 12. Note that VICTOR 14 does not change the routing for prefixes which do not belong to the set of virtual machines VM1-VM3 having migration capability.

Still referring to FIG. 1, Each forwarding element FE1-FE5 is the first layer-3 access and aggregation point for any of the virtual machines VM1-VM3 that are bound to it. To understand how packets are forwarded by VICTOR 14, consider two cases: communication between two VMs, and communication between a VM and an external user client node, e.g. a client node 16 accessing a second forwarding element FE2 from a remote location. In FIG. 1, a path taken for communication between a source VM, e.g. the first virtual machine VM1, and a destination virtual machine, for example the second virtual machine VM2, is from the first VM VM1, to the fourth FE FE4, to the third FE FE3, and then to the second VM VM2 (i.e. VM1-FE4-FE3-VM2). Note that such communication basically always takes the shortest path. Externally, the correspondent client node always delivers packets to its nearest FE, which in turn forwards packets to the FE of the destination VM. For example, the forwarding path from client node 16 to the first VM VM1 is from client node 16, to the second FE FE2, to the fourth FE FE4, and the to the first VM VM1 (i.e. client node 14-FE2-FE4-VM1). The path from the first VM VM1 to the client node 16 is VM1-FE4-FE2-client node 16. The CC 12 keeps track of the location of all the virtual machines VM1-VM3, and sets up forwarding tables on forwarding elements FE1-FE5 accordingly.

Note that unlike in conventional mobile IP architecture, here there is no distinction between home agent and foreign agent.

The entire VICTOR 14 appears as a single virtual "agent" that handles both mobile VM address registration and packet forwarding, although its components (FEs) are geographically apart from one another. The aggregated mobile VM IP address prefixes are advertised by each forwarding element FE1-FE5 to the external networks. The correspondent nodes from the external Internet can always choose the best path to reach the VICTOR 14 via the nearest forwarding element FE1-FE5. Now we describe further details of the operations of the VICTOR 14.

External Routing

Each forwarding element FE1-FE5 advertises addresses of all the mobile virtual machines VM1-VM3 that the VICTOR 14 covers. It also calculates and maintains the best routes to the external IP addresses, e.g. to the client node 16. This can be achieved by letting the forwarding elements FE1-FE5 participate in regular routing such as OSPF (or this can be done by the CC 12). A forwarding element FE1-FE5 does not announce FE-FE links T1-T10 to external routers, so that packets of non-mobile VM are not routed by the VICTOR 14.

Internal Routing

An active virtual machine e.g. VM3 discovers an adjacent forwarding element e.g. FE1 and registers itself with that forwarding element FE1. The forwarding element FE1 forwards the binding (VM3, FE1) to the CC 12. The CC 12 authenticates the binding and configures all the other forwarding elements FE2-FE5 with the binding (VM3, FE1). Only one active binding, also referred to herein as an association, for each virtual machine VM1-VM3 is allowed at a time. The virtual machine VM3 is deregistered and the old binding is removed if it becomes inactive. Similarly the binding changes when the virtual machine VM3 moves to another forwarding element FE2-FE5. Each forwarding element FE1-FE5 maintains a forwarding table including local bindings for locally registered virtual machine VM1-VM3 and foreign bindings for remotely registered virtual machine VM1-VM3.

External Packet Forwarding

When a forwarding element e.g. FE2 receives a packet destined to an external IP address e.g. to the client node 16, the packet is directly sent out to the proper port by looking up the external forwarding table.

Internal Packet Forwarding

When an FE f1 receives a packet destined to VM v (after stripping off the tunnel header if such header is present), if v has a local binding, the packet is directly forwarded to v; if v has a foreign binding (v, f2), the packet is forwarded (using tunneling, if need be) to f2; if no binding is found for v, the packet is discarded. For example, if the first forwarding element FE1 receives a packet destined to the third virtual machine VM3, to which it is locally bound, the first forwarding element FE1 forwards the packet directly to the third virtual machine VM3. If the if the first forwarding element FE1 receives a packet destined to the first virtual machine VM1, which has a foreign binding i.e. to the fourth forwarding element FE4, the first forwarding element FE1 forwards the packet to the fourth forwarding element FE4 via a tunnel e.g. a third tunnel T3.

Data Plane

Inbound and outbound traffic for mobile virtual machine VM1-VM3 are forwarded by the forwarding elements FE1-FE5. Each forwarding element FE1-FE5 may have a limited forwarding capacity. If the number of mobile virtual machine VM1-VM3 or amount of mobile traffic at a region exceeds this capacity, more forwarding elements FE1-FE5 can be deployed to split the load.

Aside from bandwidth, another resource limitation may be the number of tunnels T1-T10 that each forwarding element FE1-FE5 can support. In our basic design, each forwarding element FE1-FE5 may potentially set up a tunnel with every other forwarding element FE1-FE5 to allow maximum flexibility for data forwarding. However, since such a tunnel can be a simple IP in-IP tunnel, no sophisticated state needs to be maintained. Furthermore, the VICTOR 14 architecture does not fundamentally require a full mesh connectivity between the forwarding elements FE1-FE5, so the number of tunnels can be reduced if necessary.

Control Plane

The central controller 12 is responsible for registering location of mobile virtual machines VM1-VM3 and setting up the forwarding table on the forwarding elements FE1-FE5. In a large scale network, a single CC 12 may not be able to handle the entire signaling traffic load. Also, having only one CC 12 in the VICTOR 14 can be a single point of failure. However, such scalability and reliability requirements can be solved in many ways. For example, we can partition the mobile virtual machines VM1-VM3 addresses into different ranges, so that each CC 12 is responsible for a separate range of IP prefixes. Accordingly, forwarding elements FE1-FE5 would contact the corresponding CC 12 for different VM addresses. In this way, the location of a virtual machine VM1-VM3 is always maintained by the same CC 12, and there is no requirement for communication between CCs. Alternatively, we can partition the forwarding elements FE1-FE5 into different groups according to regions, so that each CC is assigned to one FE group. In this model, since a VM can move across FE groups, it may be beneficial for CCs to coordinate with each other. Such geographical partitioning may be more suitable for data center deployment. In either case, we can assign one or two standby CCs for each CC so that there is always a backup in case of failure.

Across Multiple Networks

We envision the VICTOR 14 to be deployed in a single network domain to allow layer 3 VM migration within the domain that hosts the data centers for cloud computing. However, it is possible to deploy the VICTOR 14 across multiple domains to allow wider mobility. When the VICTOR 14 is deployed across multiple service provider networks, the VICTOR 14 should forward packets in a way that conforms to service provider routing policies. It turns out that this is not a problem since the VICTOR 14 can rely on regular IP routing between the forwarding elements FE1-FE5 and use IP tunnels T1-T10 for its virtual backplane. The forwarding elements FE1-FE5 can route packets between each other as long as connectivity is provisioned. For example, if the VICTOR 14 is used to enable virtual machine VM1-VM3 migration between large enterprise networks, the VICTOR 14 may utilize any available VPN resources between different sites. However, if certain applications require better QoS treatment, then such agreements and provisioning should be put in place. But again, the VICTOR 14 is designed to utilize whatever underlying pipe is available.

Address Announcement

Service providers that deploy the VICTOR 14 forwarding elements FE1-FE5 would allow the mobile virtual machine VM1-VM3 prefixes to be announced in their networks. As a result, the same IP prefix will be reachable from multiple locations (i.e., from all routers that are connected to FE ports). In a multi-domain deployment, it will appear as if the same IP prefix is reachable from multiple domains. This may look like a deviation from the current Internet routing where one IP prefix typically "belongs to" one service provider. We believe that this is a policy difference and not a major technical difference. To routers external to VICTOR 14, this is similar to a multi-homed IP prefix; they could choose the next hop according to path length or policy settings. In terms of routing behavior, this is analogous to anycast routing, except the "end point" for external routers is not a set of end hosts but a set of forwarding elements FE1-FE5. However, unlike anycast routing, there is no dynamic group or membership management in the VICTOR 14 since the forwarding elements FE1-FE5 are statically provisioned and do not frequently change their IP prefix announcement. In a sense, the VICTOR 14 results in the benefit of anycast without incurring the overhead of anycast signaling and the drawback of stressing the Internet routing infrastructure. More importantly, it does not require service providers to change their routers or routing policies in their existing networks.

VM Migration for Data Centers

In a typical data center network, several border routers connect the data center network to the service provider's network. Once packets come in from Internet via the border routers, they traverse through multiple middle boxes such as firewalls and load balancers. Packets are then switched to one of the internal servers. Depending on the application logic, internal servers can access each other to accomplish the user demanded service. For example, a web server can access an application server which in turn accesses a database server.

Internal Migration

Current VM technologies support migration within a LAN, so no additional mechanisms are needed for small data centers where all devices are contained in one subnet. However, it is more common for a data center to have multiple layer 3 networks due to scalability and policy reasons. In this case, layer 2 switches are used to connect hosts in the same subnet, and layer 3 routers are used to connect different subnets. To allow VM migration across subnets inside a data center, the forwarding elements FE1-FE5 can be deployed at the layer 3 routers. The VICTOR 14 implementation is as follows:

Since all virtual machines VM1-VM3 are in the same data center, the Internet routers do not have to be aware of VM migration. Hence the forwarding elements FE1-FE5 do not have to advertise the mobile VM prefixes.

The registration message for a mobile virtual machine VM1-VM3 can be simply an ARP message. In layer 3 migration, when a given virtual machine e.g. VM3 moves from original subnet to destination subnet, it sends an ARP message to announce its new location. The forwarding element e.g. FE1 in the new location then signals the CC 12 to record the virtual machine's VM3 new location, and sets up flow forwarding on other the forwarding elements FE2-FE5 accordingly. The FE in the original subnet also sends an ARP in the original subnet to proxy for the virtual machine VM3.

One important issue that we have not discussed so far is the policy enforcement. Security policies may require different flows in the data center to traverse through different middle boxes in different orders. Such policy enforcement may be violated if VM migration is not handled carefully. Hence it is important to check policy consistency in both the forwarding elements FE1-FE5 and the CC 12. For a data center that assigns policy enforcement based on subnets or VLANs, a potential VM migration can simply be rejected if such migration violates any policy. For a data center that dynamically adjusts layer 2 routing based on policy requirements [13], the forwarding elements FE1-FE5 can be integrated as part of a policy aware switching framework.

External Migration

To support VM migration across multiple data centers using the VICTOR 14, each mobile virtual machine VM1-VM3 is assigned to a respective IP address that is not overlapping with any the other hosts in all data centers.

Data centers can assign either public or private IP addresses to physical or virtual hosts. If all such virtual machines VM1-VM3 are assigned public IP addresses, then naturally there will be no address conflict across data center locations. The border routers of all data centers would advertise such public mobile VM IP prefixes.

For the private IP address case, each data center advertises several virtual IP addresses (VIP) to the Internet, so that the users access the servers using such a VIP. Inside the data center, the servers are assigned with a real IP address (RIP). The load balancer in the data center translates the VIP into an RIP on the fly. In this scenario, separate mobile virtual machine VM1-VM3 IP prefixes should be assigned and made common to all data centers, so that such address prefixes will not conflict with the RIPs of other hosts. The border routers of all data centers advertise the VIPs corresponding to the mobile virtual machine VM1-VM3 RIP prefixes externally.

In both cases, the forwarding elements FE1-FE5 are deployed at border routers. We refer to such FEs as border FEs hereafter. Border FEs can be border routers modified to support VICTOR API, or can be separate FE boxes co-located with regular border routers. Depending on the amount of VM migration operations, either one or multiple CCs can be deployed to handle the VM migration signaling.

VM migration inside each data center can be handled as before. When a virtual machine e.g. VM3 migrates from an original data center to a new data center, the forwarding element e.g. FE1 at the destination subnet of the new data center receives the ARP message from the virtual machine VM3, which triggers the CC 12 to set up flow forwarding at the other forwarding elements FE2-FE5 including border FEs. Hence the traffic received by a border FE that is destined to the migrated VM can be forwarded to its new location across the tunnel between data centers. Again, policies are checked and enforced so that the migration will not violate any security rules.

Figure 2:
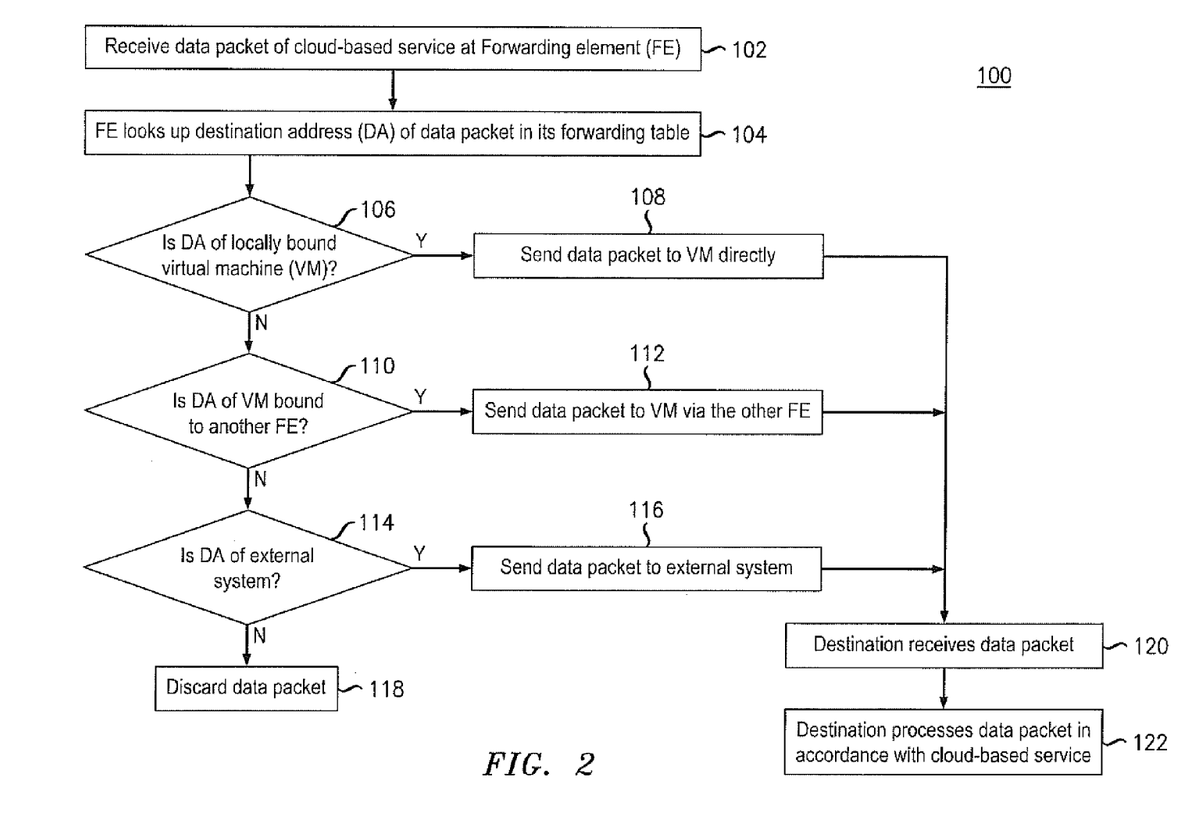
FIG. 2 illustrates a method of providing a cloud-based service using dynamic network virtualization that is in accordance with a second embodiment of the invention.

Referring to FIG. 2, and with additional reference to FIG. 1, a method 100 of providing a cloud-based service using dynamic network virtualization will now be described. The method 100 starts with receiving 102 a data packet of the cloud-based service at a forwarding element. The forwarding element looks up 104 the destination address of the data packet in its forwarding table. The forwarding element then makes a first determination 106 whether or not the destination address is of a virtual machine that is locally bound to the forwarding element. In the affirmative case the forwarding element sends 108 the data packet directly to the locally bound machine. That is, by 'directly' we mean that the data packet is not sent via another forwarding element to the locally bound virtual machine. For example, if the third forwarding element FE3 receives the data packet and the destination address of the data packet is that of the second virtual machine VM2, then responsive to the first determination 106, the third forwarding element FE3 sends 108 the data packet directly to the second virtual machine VM2.

In the negative case of the first determination 106, a second determination 110 is then made by the forwarding element as to whether or not the destination address of the data packet is that of a virtual machine bound to another forwarding element of the VICTOR 14. In the affirmative case, the data packet is sent 112 to that virtual machine via the other forwarding element. For example, if the fourth forwarding element FE4 receives the data packet and its destination address is that of the second virtual machine VM2, then responsive to the first and second determinations 106, 110, the fourth forwarding element FE4 sends 112 the data packet to the second virtual machine VM2 via the third forwarding element FE3.

In the negative case of the second determination 110, the forwarding element makes a third determination 114 as to whether or not the destination address of the data packet is that of an external system, i.e. a system external to the VICTOR 14 and to the virtual machines that are bound to forwarding elements of the VICTOR 14. In the affirmative case the forwarding element sends 116 the data packet to the external system, otherwise it discards 118 the data packet. For example, if the second forwarding element FE2 receives the data packet and its destination address is that of the client node 16, then responsive to the first to third determinations 106, 110, 114, the second forwarding element FE2 sends 116 the data packet to the client node 16, otherwise it discards the data packet.

It should be understood that the order of the first, second and third determinations 106, 110, 114, can be interchanged and the method 100 will still operate as intended as long as the data packet is discarded 118 only when none of these determinations 106, 110, 114 results in an affirmative case.

If the data packet is not discarded 118, then the destination receives 120 the data packet and processes 122 the data packet in accordance with the cloud-based service.

Figure 3:
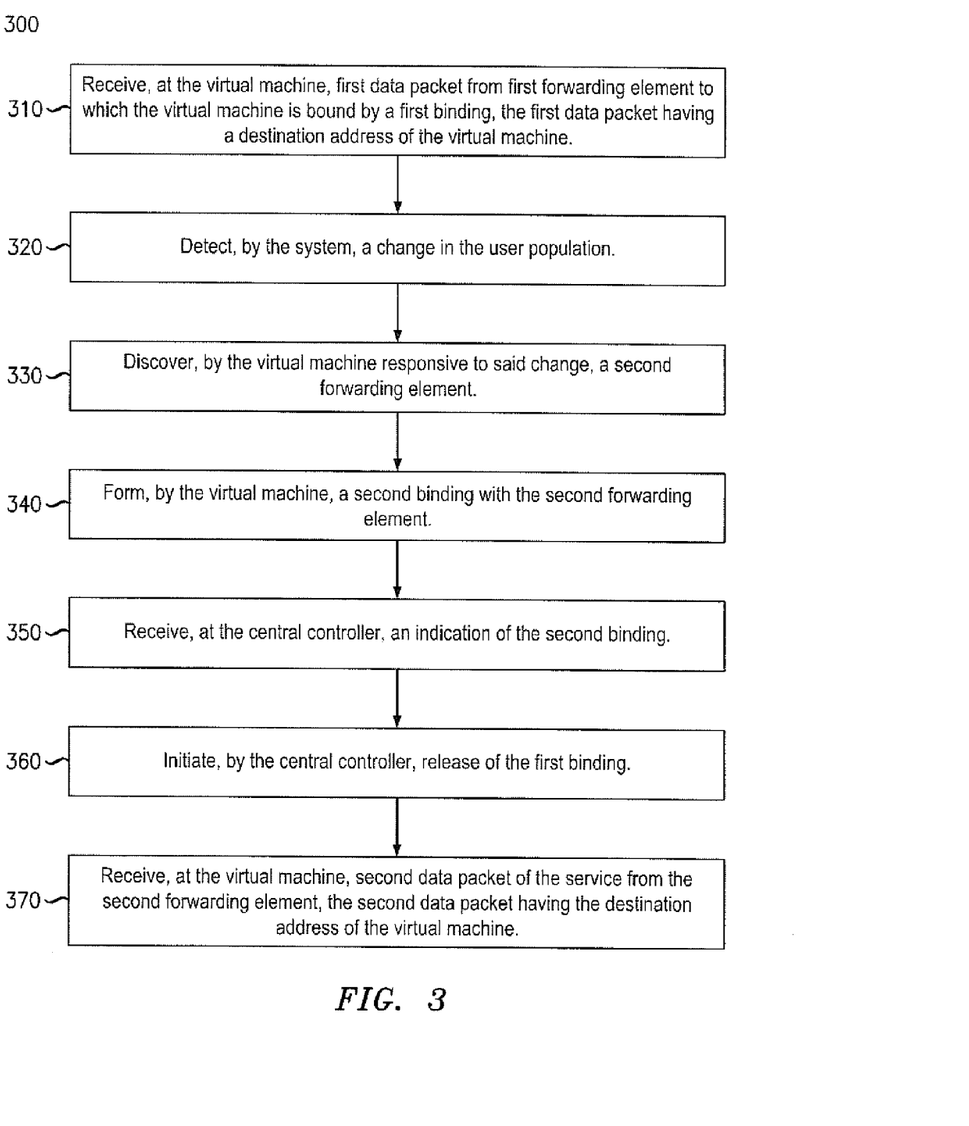
FIG. 3 illustrates a method of migrating a virtual machine providing a cloud-based service to a user population via a system having a dynamic network virtualization architecture.

FIG. 3 illustrates a method 300 of migrating a virtual machine providing a cloud-based service to a user population via a system having a dynamic network virtualization architecture. Method 300 may be performed among components of a system including a plurality of forwarding elements controlled by a central controller such as, for example, system 10. The method 300 may begin in step 310 where a virtual machine may receive a first data packet associated with the service from a first forwarding element to which the virtual machine is bound by a first binding. This first data packet may include a destination address of the virtual machine. Next, in step 320, the system may detect a change in the user population, thereby prompting migration of the virtual machine. In response, the virtual machine may, in step 330, discover a second forwarding element and, in step 340, form a second binding with the second forwarding element. Next, at step 350, the central controller may receive an indication of this second binding and, in response at step 360, initiate release of the first binding. Thereafter, the virtual machine may, in step 370, receive a second data packet associated with the service from the second forwarding element. This second data packet may include the same destination address of the virtual machine that was carried by the first data packet, even though the virtual machine has now been migrated to a new location.

Enabling New Applications

The VICTOR 14 architecture makes virtual machine migration more flexible and not limited to LANs. This enhances or enables many new applications. We give a few such examples in the following.

Mobile Shadow Virtual Machine

In the thin client model, inexpensive terminal devices (thin clients) handle complex tasks by accessing applications resident in the network and not resident on the device itself. This "cloud computing" model is attractive for several reasons such as: the flexibility it offers users in providing a uniform user experience across multiple devices, it lowers device costs, and enables dynamic deployment of new services. An example is the virtual desktop service. Similarly, game providers can offer provider hosted games, which allow users to play sophisticated games using low-cost PCs or micro devices, without expensive hardware. It is beneficial if the VMs providing these services can be located close to the thin clients accessing them. Network infrastructure support to move VMs over wide areas so that they can track client access patterns is clearly beneficial in this context since it avoids the burden of traversing long network paths that incur significant delay and wastes resources.

For such applications, dedicated VMs, for each client, would be created in server farms located in data centers. These VMs serve as the shadow machine for the correspondent client node. FEs can be deployed at the hosting data center or server farms. The mobile client node would delegate all the computing and storage tasks to its shadow virtual machine, and pull the results from it. In this way, computation or bandwidth intensive tasks such as virus scanning and peer-to-peer (P2P) downloads can be done at VMs instead of the client devices.

For good performance and efficiency the shadow VM should be as close to the client node as possible. When the shadow VM is initialized, it can be created in a data center close to the client node. If the client moves to a different region and stays on for an extended period of time, a live VM migration can be done to move the shadow VM to the data center in the new region. In this way, users can access their VMs much faster and have better user-experience. This also reduces unnecessary bandwidth costs and delays due to traversal of long network paths.

Optimized Cloud Computing

According to a cloud computing services model, users can rent computing capabilities from such providers and pay according to usage. In this model, the resource usage pattern can be quite bursty. For example, if a small enterprise rents server capacity from Service Provider to start its own video content server, it may see different amounts of traffic coming from different regions according to the time of the day. The VICTOR 14 allows VM servers supporting this enterprise to be migrated across data centers as needed to minimize user delays and improve performance. Similarly, VM migration can also help data centers to manage processing load across servers and regions. This can be done for energy efficiency and for avoiding processing bottlenecks. For example, a load balancer could dynamically monitor load on all servers. During non-peak hours, VMs could be packed into fewer servers and hence allow idle servers to be shutdown. During peak hours, VMs could be migrated back and spread across more servers. The VICTOR 14 architecture permits this to be done on a much wider scale, for example beyond the same LAN or data center.

It should be understood from the foregoing that embodiments of the invention provide an advantage of enabling on-line migration of virtual machines across layer 3 IP networks. By supporting such wide area VM migration, these embodiments can significantly improve performance of cloud computing applications, and also enable interesting new applications.

It should be further understood from the foregoing that embodiments of the invention provide another advantage, in that, compared to intra-LAN VM migration, wide-area VM migration makes computation in data centers much more flexible and potentially more efficient. Compared to prior art wide-area VM migration solutions based on dynamic domain name system (DNS), the present approach of embodiments of the invention have several advantages. First, the present approach makes VM migration transparent to both clients and servers; no software modification is needed at either end. It is also orthogonal to behavior of other entities such as DNS servers since no change in DNS entry is needed. Second, the migration time solely depends on VM data copying between source and destination sites. The VM is cleanly separately from the original hosting machine once migration is completed; no data forwarding is needed once VM starts running at new location.

Numerous modifications, variations and adaptations may be made to the embodiments of the invention described above without departing from the scope of the invention, which is defined in the claims.

What is claimed is:

1. A method of migrating a virtual machine providing a cloud-based service to a user population via a system having a dynamic network virtualization architecture comprising a plurality of forwarding elements controlled by a central controller, the method comprising:

receiving, by the virtual machine, a first data packet of said service from a first forwarding element to which the virtual machine is bound by a first binding, the first data packet having a destination address of the virtual machine;

discovering, by the virtual machine, a second forwarding element;

forming, by the virtual machine, a second binding with the second forwarding element; and receiving, by the virtual machine, a second data packet of said service from the second forwarding element, the second data packet having the destination address of the virtual machine.

2. The method of claim 1, wherein the step of forming a second binding with the second forwarding element comprises:
   sending an address resolution protocol (ARP) message to the second forwarding element.

3. The method of claim 1, wherein the destination address of the virtual machine is a public IP address.

4. The method of claim 1, wherein the destination address of the virtual machine is a private IP address and the virtual machine is also associated with a virtual IP address.

5. The method of claim 4, wherein the virtual IP address includes a virtual IP address prefix that is common to multiple data centers.

6. The method of claim 1, wherein the first forwarding element and the second forwarding element are located in different data centers.

7. The method of claim 1, further comprising:
   prior to discovering the second forwarding element, migrating from an original subnet to a destination subnet.

8. The method of claim 1, wherein, after the step of forming a second binding with the second forwarding element, the virtual machine is no longer in direct communication with the first forwarding element.

\* \* \* \* \*